United States Patent
Eiland

(12) 
(10) Patent No.: US 6,390,752 B1
(45) Date of Patent: May 21, 2002

(54) HAY LOADING GOOSE NECK TRAILER

(76) Inventor: Melvin Eiland, 437 W. Darvilla, Rockdale, TX (US) 76567

( * ) Notice: Subject to any disclaimer, the term of this patent is extended or adjusted under 35 U.S.C. 154(b) by 0 days.

(21) Appl. No.: 09/524,709

(22) Filed: Mar. 14, 2000

(51) Int. Cl.$^7$ ................................................ A01D 90/00
(52) U.S. Cl. ...................... 414/111; 414/24.5; 414/491; 414/554
(58) Field of Search ............................... 414/24.5, 24.6, 414/111, 480, 489, 491, 528, 551, 554

(56) References Cited

U.S. PATENT DOCUMENTS

| | | | | |
|---|---|---|---|---|
| 4,050,598 A | * | 9/1977 | Schurz | 414/551 X |
| 4,103,794 A | * | 8/1978 | Shaw | 414/551 X |
| 4,253,786 A | * | 3/1981 | Harkness | 414/24.5 |
| 4,537,548 A | * | 8/1985 | Lockhart | 414/111 X |
| 5,071,304 A | * | 12/1991 | Godfrey | 414/111 |
| 5,919,021 A | * | 7/1999 | Eiland | 414/111 |

* cited by examiner

*Primary Examiner*—Janice L. Krizek
(74) *Attorney, Agent, or Firm*—R. Darryl Burke; McKool Smith, P.C.

(57) ABSTRACT

A trailer to load and transport a bail of hay comprises a towing assembly and a flat bed. The towing assembly selectively attaches to a towing vehicle. The flat bed selectably attaches to the towing assembly. The flat bed has a forked assembly. The forked assembly has at least one prong. The at least one prong is bent at a an angle toward the towing vehicle. The forked assembly is adapted to selectively pivot around an axle attached to a first position of the flat bed, so that the forked assembly is able to lift the bail of hay onto the first position of the flat bed. The flat bed has at least one motorized transport mechanism to transport the bail of hay from the first portion of the flat bed to as second portion of the flat bed. The motorized transport mechanism is a motorized grips and secures the bail of hay. The flat bed has a pair of wheels, at least one wheel on each side of the flat bed. The flat bed has a support wheel positioned between one wheel on one side of the flat bed and the first position.

16 Claims, 6 Drawing Sheets

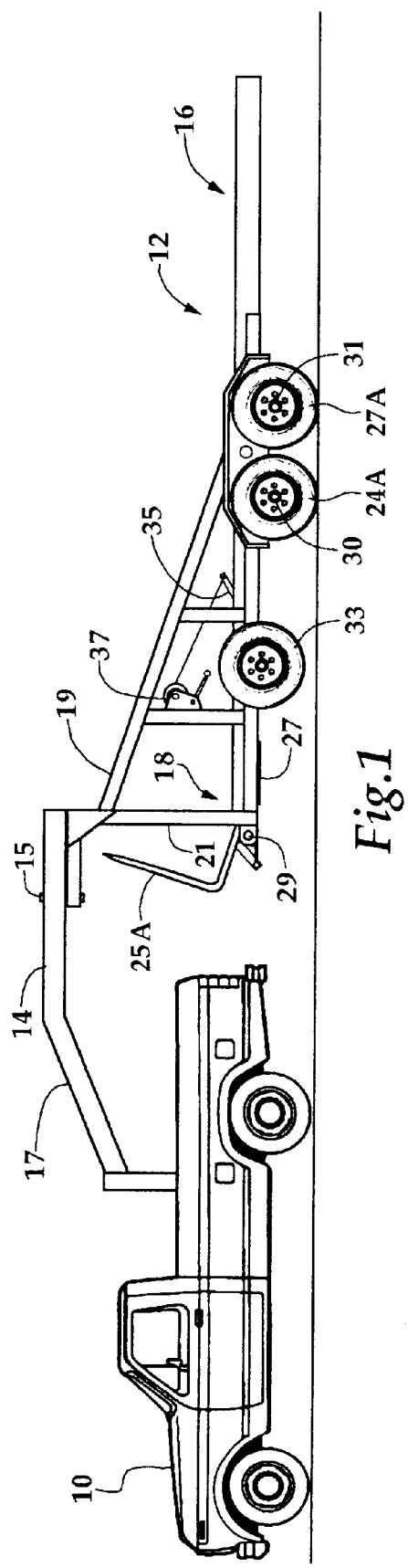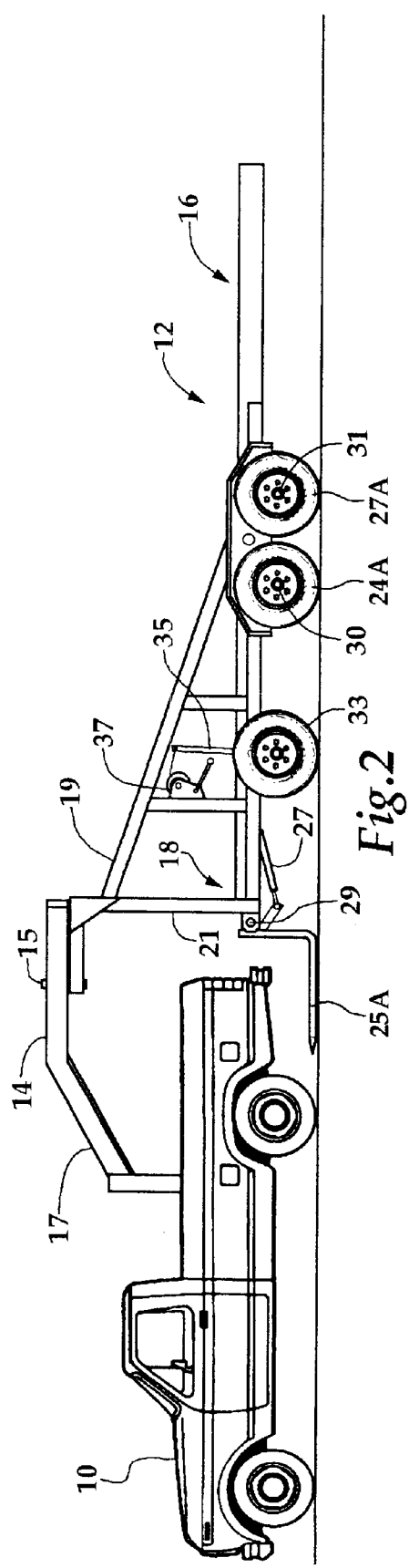

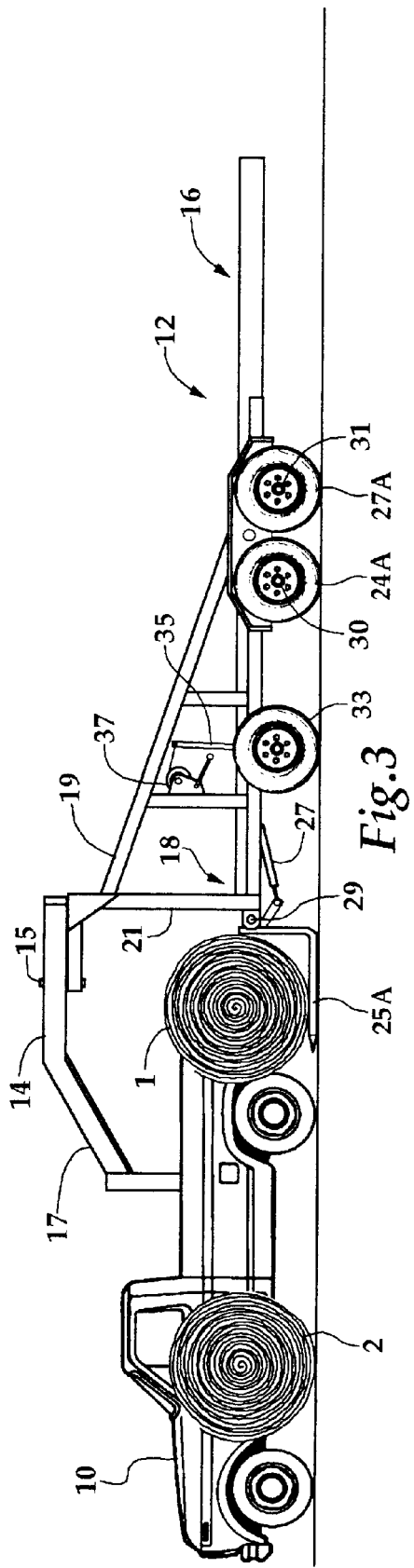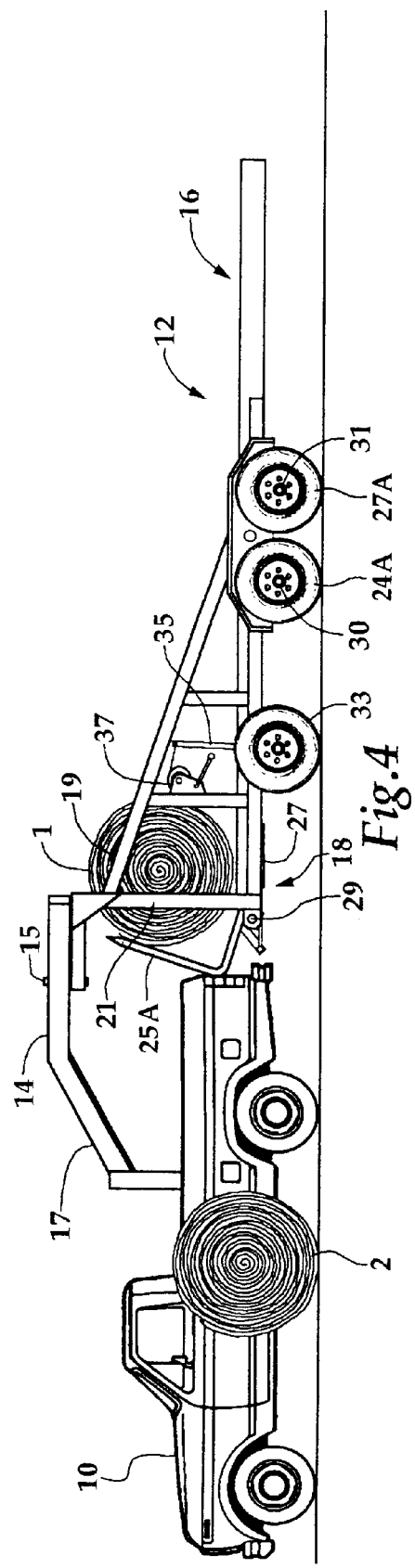

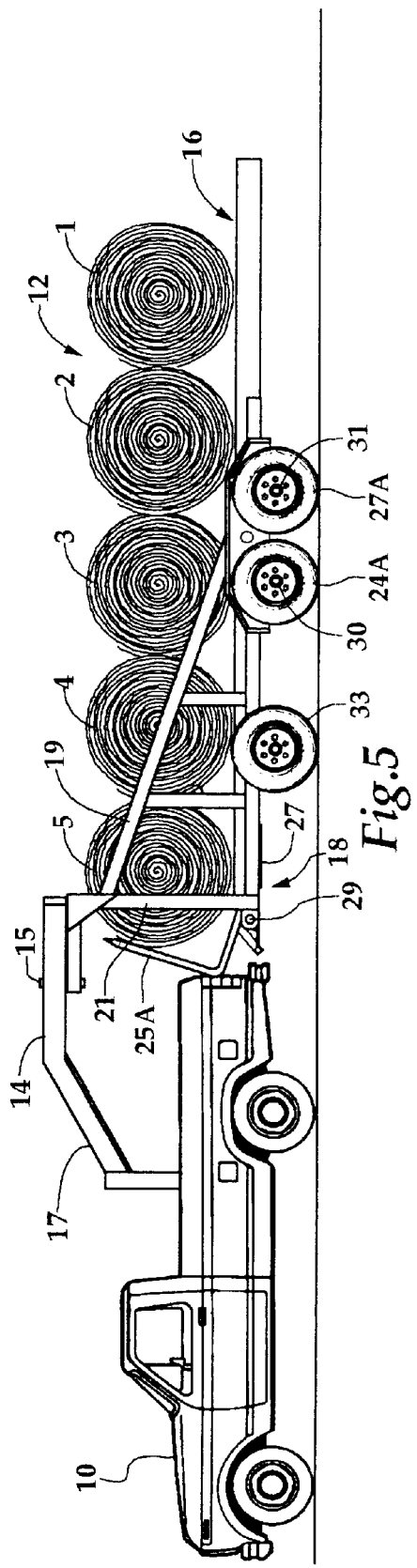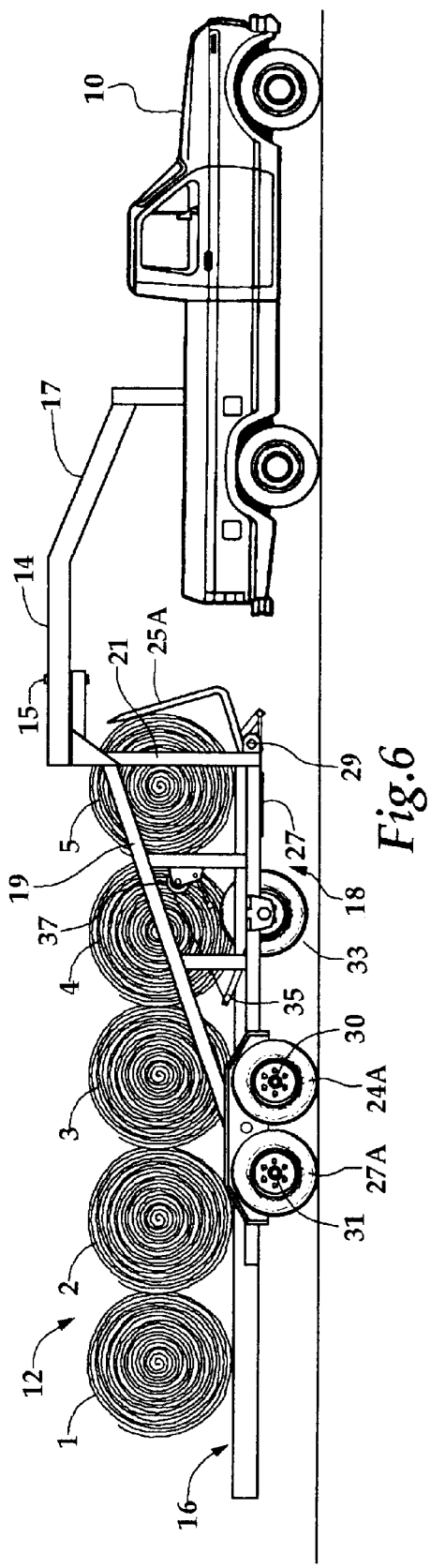

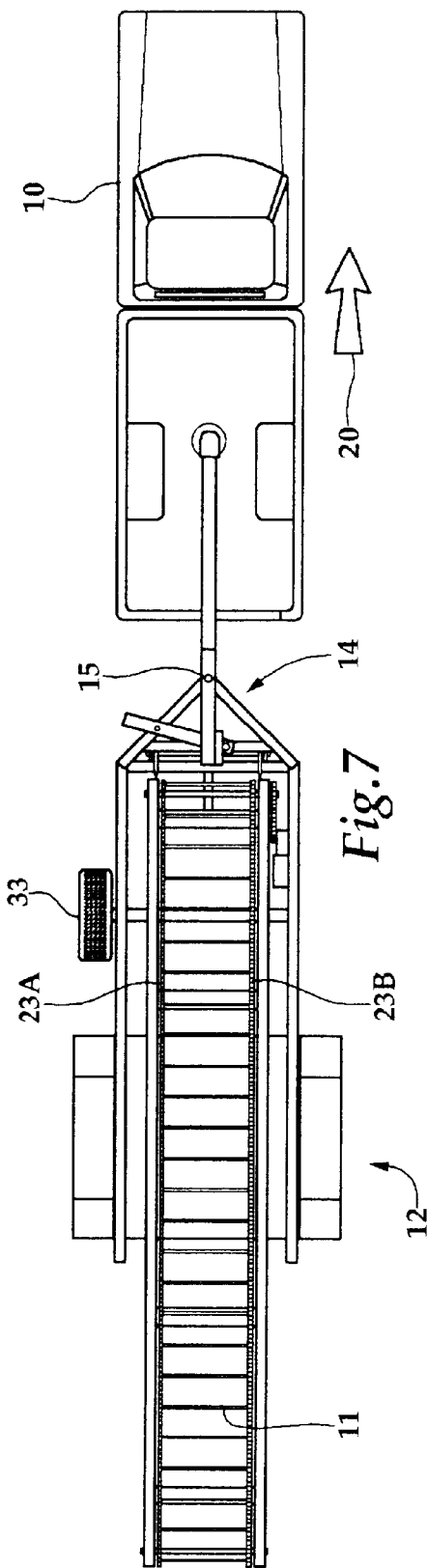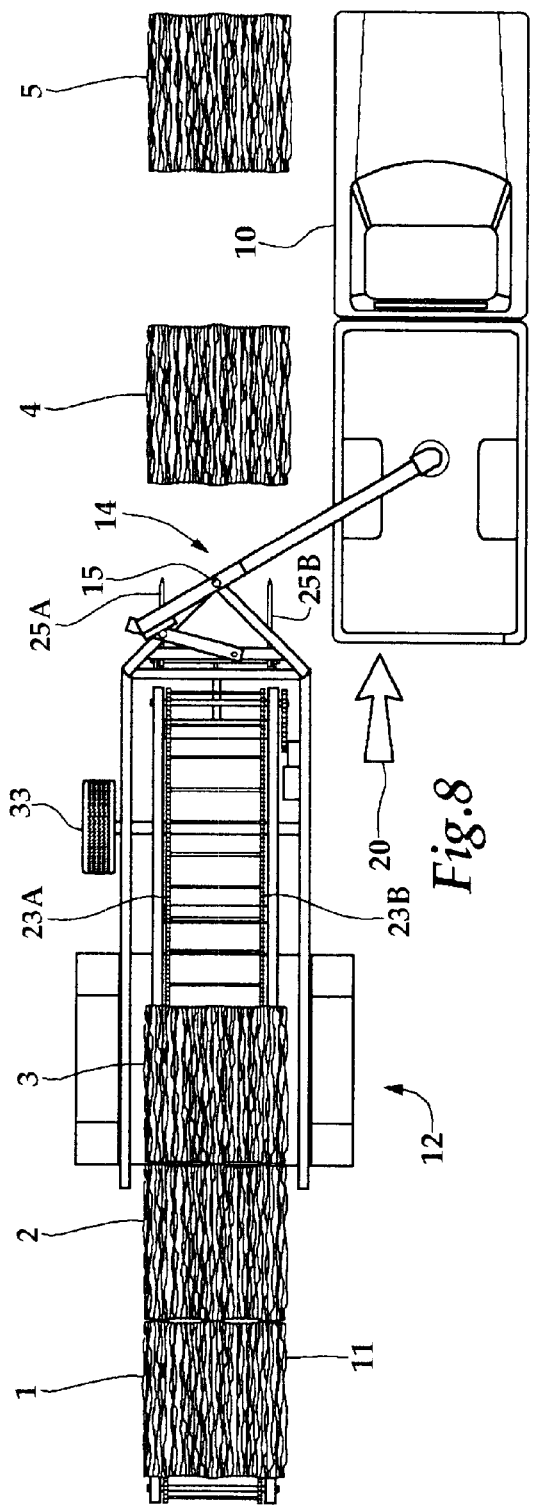

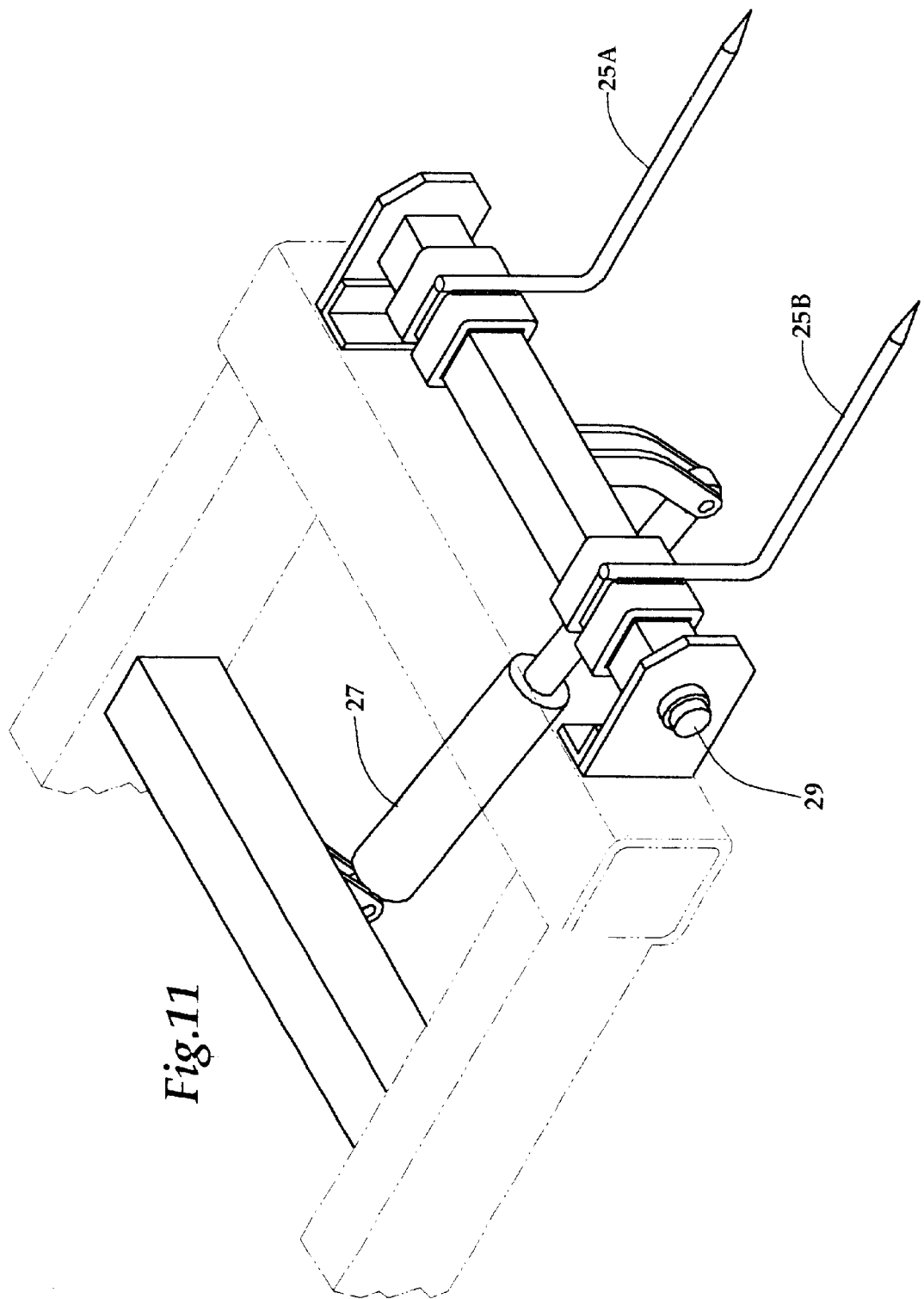

HAY LOADING GOOSE NECK TRAILER

©Copyright. 2000. Melvin C. Eiland. All of the material in this patent application is subject to copyright protection under the copyright laws of the United States and of other countries. As of the first effective filing date of the present application, this material is protected as unpublished material.

However, permission to copy this material is hereby granted to the extent that the owner of the copyright rights has no objection to he facsimile reproduction by anyone of the patent document or patent disclosure, as it appears in the United States Patent and Trademark Office patent file or records, but otherwise reserves all copyright rights whatsoever.

FIELD OF INVENTION

The present invention generally relates to the field of farm equipment and processes used to land and haul bails of hay and particularly relates to loading and hauling systems and processes comprised of loading apparatus and a trailer.

BACKGROUND

The loading and hauling of bails of hay can be improved in a number of ways. Once bails of hay are created, they are generally left in the field until additional equipment can be used to load and move them as they are quite heavy and difficult to load and move. Traditional techniques of gathering and hauling these bails of hay require the use of two (2) pieces of equipment—(i) a truck or trailer; and (ii) a crane of some sort to pick up and move the bails of hay to a truck or trailer, which necessitate more than one operator to load and unload the bails of hay. This is expensive and troublesome. The inventor has designed an earlier piece of equipment described and patented in U.S. Pat. No. 5,919,021, which is herein incorporated by reference.

SUMMARY

Preferred embodiments of the trailer load and transport at least one bail of hay and are comprised of a goose neck assembly and a flat bed trailer. The goose neck assembly is attachable to a towing vehicle, such as a pick-up truck. The trailer is attached to the goose neck assembly and able to pivot about at least one axle, so that one portion of the flat bed trailer can be moved preferably from behind the towing vehicle to the passenger side (right) of the towing vehicle, which is preferred, or from behind the towing vehicle to the driver side (left) of the towing vehicle (i.e., positions parallel to the towing vehicle), which thereby enables the loading of a bail of hay on the front portion of the trailer in plain view of the operator of the towing vehicle. Once the bail(s) of hay are loaded on a first portion of the flat bed trailer, a motorized transport system, having at least two conveyor chains attached together by at least one bar to grip and secure the bail(s) of hay, transports the bail(s) of hay from the first portion of the flat bed trailer to a second portion of the flat bed trailer (i.e., from the front of the flat bed trailer to the back of the flat bed trailer). A motor can be used to automatically raise and/or lower a forked or loading assembly, which is preferably comprised of at least one prong. The prong(s) are preferably bent at a 90 degree angle and pivot from an up position to a down position around a prong axle attached to and located at the first position (the front portion) of the flat bed trailer. The prong axle is preferably oriented perpendicular to the direction of movement of the pick-up and trailer, as the prong axle traverses the trailer. The flat bed trailer also preferably has a first pair of wheels and a second pair of wheels joined by respective axles with at least one wheel on each side of the flat bed trailer. The flat bed trailer is preferably kept level. The flat bed also has a support wheel positioned between one wheel on one side of the flat bed trailer and the first position, preferably offset from the axle.

Preferred embodiments provide a number of advantages, important functions and key features. In particular, preferred embodiments are self-loading and unloading and, thus, only require one operator. Preferred embodiments are also able to haul five (5) or six (6) bails of hay at one time. Preferred embodiments are also able to load from the front of the trailer, as opposed to the side or rear of the trailer, which, among other things, makes it easier for the operator to control. Other advantages of the invention and/or inventions described herein will be explained in greater detail below.

BRIEF DESCRIPTION OF THE DRAWINGS

The accompanying the drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein:

FIG. 1 is a cross-sectional view of pick-up truck 10 towing a preferred embodiment of trailer 12, with support wheel 33 and forked or loading assembly, prongs 25A and 25B in a raised position;

FIG. 2 is a cross-sectional view of pick-up truck 10 towing a preferred embodiment of trailer 12, with support wheel 33 and forked or loading assembly, prongs 25A and 25B, in a lowered position;

FIGS. 3 and 4 are cross-sectional views of pick-up truck 10 towing a preferred embodiment of trailer 12, with support wheel 33 in a lowered position, and forked or loading assembly, prongs 25A and 25B, actually loading bails of hay 1;

FIGS. 5 and 6 are cross-sectional views of a pick-up truck 10 towing a preferred embodiment of trailer 12, with support wheel 33 and forked or loading assembly, prongs 25A and 25B, in a raised position, transporting multiple bails of hay 1, 2, 3, 4, and 5;

FIG. 7 is a top view of pick-up truck 10 towing a preferred embodiment of trailer 12, with forked or loading assembly prongs 25A and 25B, in a raised position;

FIG. 8 is a top view of pick-up truck 10, towing a preferred embodiment of trailer 12 and forked or loading assembly, prongs 25A and 25B, actually loading bails of hay 4;

FIG. 11 is a perspective view of a forked or loading assembly having prongs 25A and 25B.

DETAILED DESCRIPTION OF THE PREFERRED EMBODIMENT

Figure 9:
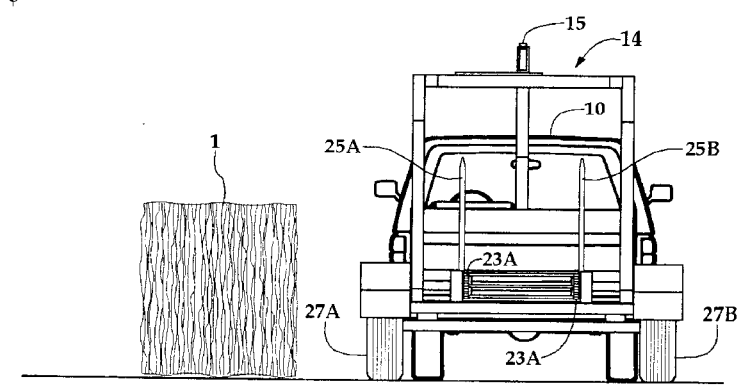
FIG. 9 is a rear view of pick-up truck 10, towing a preferred embodiment of trailer 12.

The preferred embodiment will be described by referring to apparatus showing various examples of how the inventions can be made and used. When possible, like reference characters are used throughout the several views of the drawing to indicate like or corresponding parts.

FIGS. 1 and 2 are cross-sectional views of pick-up truck 10 towing a preferred embodiment of trailer 12, with support wheel 33 and forked or loading assembly, prongs 25A and 25B, in a raised position (in FIG. 1), which constitutes a raised fork and lowered position (in FIG. 2), which constitutes a lowered fork. FIG. 7 is a top view of pick-up truck 10 towing a preferred embodiment of trailer 12, with forked or loading assembly, prongs 25A and 25B, in a raised position. FIG. 9 is a rear view of pick-up truck 10, towing a preferred embodiment of trailer 12, along side bail of hay 1. FIGS. 5 and 6 are cross-sectional views of a pick-up truck 10 towing a preferred embodiment of trailer 12, transporting multiple bails of hay 1, 2, 3, 4, and 5, with support wheel 33 in a raised position (in FIG. 6) and in a lowered position (in FIG. 5) and forked or loading assembly, prongs 23A and 23B, in a raised position (in FIGS. 5 and 6). An advantage of using wheel 33 to support trailer 12, especially when fully loaded, is that it rotates and, thus, provides support, even when trailer 12 is moving. Support wheel 33 is preferably offset from the closest axle by at least 10" by a 10" plate. In addition, wheel 33 does not need to be raised and lowered after each bail of hay 1 is loaded, as the bails of hay are typically left or otherwise deposited at various locations in a pasture, which saves time. Trailer 12 is preferably a flat bed trailer or includes flat bed 11. Flat bed 11 is preferably kept stable and level by wheels 24A and 24B (shown in FIGS. 6, 9, and 10), joined by an axle, and wheels 27A and 27B (shown in FIGS. 6, 9, and 10), joined by an axle.

Figure 10:
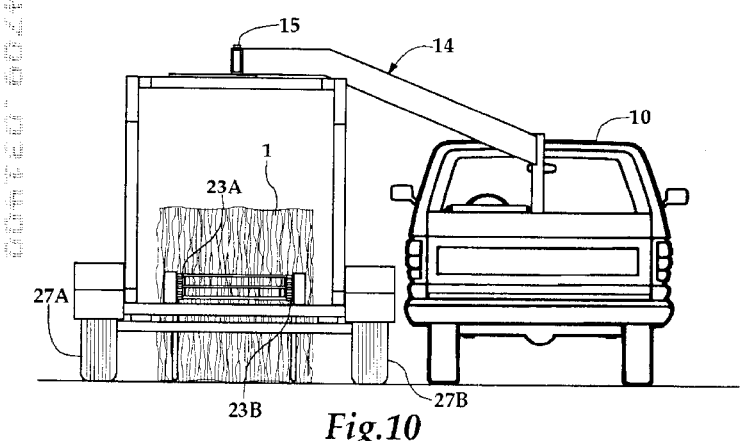
FIG. 10 is a rear view of pick-up truck 10, towing a preferred embodiment of trailer 12, and forked or loading assembly, prongs 25A and 25B, in a lowered position to load bail of hay 1.

FIGS. 3, 4, 8, and 10 show the preferred embodiment of trailer 12 in the process of loading at least one bail of hay. FIGS. 3 and 4 are cross-sectional views; FIG. 8 is a top view; and FIG. 10 is a rear view. FIG. 3 shows bails of hay 1 and 2 being loaded on the driver side of pick-up 10. Trailer 12 is generally comprised of flat bed 11 and goose neck assembly 14, attached to one another. Trailer 12 is preferably 31 feet, 10 inches in length, and generally comprised of a front portion 18 and a rear portion 16. Goose neck assembly 14 is preferably secured to trailer 12, the resulting length of which is preferably 44'. Frame 17 is preferably 10" channels welded together. Angle support frame 19 is preferably all square 3"×3" tube and vertical support frame 21 is preferably all rectangular 3"×6" tube. As shown in FIGS. 7 and 8, goose neck assembly 14 pivots to direct or orient flat bed 11 away from and along-side pick-up truck 10, as pick-up truck 10 is traveling in the forward direction 20. Goose neck assembly 14 pivots around pivot pin 15 and can be locked by hand into either a first position behind pick-up truck 10 with a lock pin.

Referring again to FIGS. 3 and 4, once flat bed 11 is along side pick-up truck 10, bent prongs 25A and 25B are joined to first trailer portion 18 (i.e., the front portion), which is the portion of flat bed trailer 12 that is nearest pick-up truck 10, and are lowered by motor 27. Prongs 25A and 25B pivot around a prong axle, pivot point 29 (preferably 1¼ cold roll shaft rod inside angle 31 (3"×3"×½")), as shown in FIG. 11. Prongs 25A and 25B together form a forked or loading assembly. Prongs 25A and 25B are preferably bent at a 90° angle, toward pick up 10 when in a lowered position. Prongs 25A and 25B are preferably bent at approximately 18" away from the prong axle, pivot point 29, used to rotate prongs 25A and 25B, leaving approximately 45" on the prong after the bend. Prongs 25A and 25B are preferably comprised of 1-15/16" cold roll steel. One or more pairs of wheels 24 are also preferably positioned in close proximity to the center of flat bed 11. Pairs of wheels 24A and 24B and 27A and 27B use axles 30 and 31, respectively. The use of at least two pairs of wheels 24A and 24B and 27A and 27B are preferred, because it stabilizes flat bed 11 and keeps flat bed 11 level, especially while flat bed 11 is being loaded, as the bails of hay are quite heavy. In addition, as discussed above, wheel 33 is preferably used to stabilize flat bed 11, while flat bed 11 is being loaded. Wheel 33 can be selectively raised and lowered by raising axle 35 with crank 37, as shown in FIGS. 1 and 2. Wheel 33 is preferably in the raised position, when trailer 12 is being hauled or transported by pick-up truck and is the lowered position, when trailer 12 is being loaded. Wheel 33 stabilizes trailer 12, while flat bed 11 is being loaded, especially before multiple bails of hay can be loaded on flat bed 11 to counterweight the bail of hay being loaded by prongs 25A and 25B. Once prongs 25A and 25B of flat trailer 16 is in the "down" position, prongs 25A and 25B spike bails of hay 1, 2, 3, etc., individually, and raise and transport bails of hay 1, 2, 3, etc., one at a time, to front trailer portion 18 of flat bed 11. Alternatively, prongs 25A and 25B travel beneath bails of hay 1, 2, 3, etc. individually, and when raised bails of hay 1, 2, 3, etc. thereafter, travel or roll down prongs 25A and 25B onto first portion 18 of flat bed 11. When bails of hay 1, 2, 3, etc. arrive on first portion 18 of flat bed 11, motorized conveyor chains 23A and 23B, which are preferably attached together with at least one bar, secures bails of hay 1, 2, 3, etc. and transports bails of hay 1, 2, 3, etc. back toward the second trailer portion 16 of flat bed 11, away from pick-up truck 10. Chains 23A and 23B, joined by at least one bar, are preferably turned or powered with an electric motor or an electric winch. Bails of hay may also need to be secured in position with chains, hooks, rope, etc, which are not shown in the figures, but could be easily added.

In particular, when the operator is ready to start loading bails of hay, the operator preferably turns pick-up truck to the right at about a 45° angle and, then, lower prongs 25A and 25B to the ground far enough to begin to lift first portion 16 of flat bed 11. Next, the operator pulls the #1 lock pin and backs pick-up truck 10 enough to insert the #2 lock pin. Then, the operator raises prongs 25A and 25B just enough to clear the ground and pull forward to get straight toward bail 1 of hay, as shown in FIGS. 3, 8, and 10.

Once, prongs 25A and 25B are oriented correctly and in proper position, wheel 33 is preferably lowered to keep flat bed 11 from tilting over when loading. To do this, one pulls or rotates on axle winch 37 and when lever 35 moves, it causes the axle to rotate making wheel 33 go down or lower. In preferred embodiments, this works like this because the axle has a 10" offset from the spindle, such as a 10" plate. The axle is allowed to rotate by not welding the spring pad to the axle and leaving the spring hander bolts slightly loose. In addition, a plate may be welded to the end of the axle and to the wheel spindle and is offset by 10", so that when one rotates the axle with the lever, the wheel will travel up and down. By doing so, flat bed 11 stays level, while loading, and the operator is able turn from side to side without difficulty.

Prongs 25A and 25B may also be used to help attach flat bed 11 along with goose neck assembly 14 to pick-up truck 10. To hitch flat bed 11 to the pick-up truck 10, one preferably places a block of wood under prongs 25A and 25B, before prongs 25A and 25B are lowered. Then, prongs 25A and 25B are lowered down, which will indirectly raise first portion 16 of flat bed 11, so that one can back pick-up truck 10 under goose neck assembly 14. Goose neck assembly 14 can be lowered by raising prongs 25A and 25B.

Bails of hay 1, 2, 3, etc. are unloaded by using the reverse procedure. Specifically, motorized chains 23A and 23B transport bails of hay 1, 2, 3, etc. toward the front trailer portion 8 of flat bed trailer 11, toward pick-up truck 10, and, once bails of hay 1, 2, 3, etc. reach prongs 25A and 25B, prongs 25A and 25B are pivoted into the down position with the bail(s) of hay 1, 2, 3, etc. resting thereon. Alternatively, bails of hay 1, 2, 3, etc. can in certain circumstances be transported off second portion 18 of flat bed 11.

FIG. 2 and FIG. 4 show pick-up truck 10 towing a preferred embodiment of trailer 12 along direction 20, which is fully loaded with bails of hay 1, 2, 3, 4, 5, and 6. FIG. 2 is a side view and FIG. 4 is a top view. Note trailer 12 has already pivoted back in a position behind pickup truck 10 and prongs 25A and 25B have been retracted into the upward position. As discussed above, goose neck assembly 14 is also directly behind pick-up truck 10 and secured with pivot pin 15 (or other locking mechanism) to prevent trailer 12 from swinging while being towed.

FURTHER MODIFICATIONS AND VARIATIONS

Although the invention has been described with reference to a specific embodiment, this description is not meant to be construed in a limiting sense. The example embodiments shown and described above are only intended as an example. Various modifications of the disclosed embodiment as well as alternate embodiments of the invention will become apparent to persons skilled in the art upon reference to the description of the invention. For instance, other vehicles can be used to tow trailer 12. Similarly, while electric motors or electric wrenches are preferred to power chains 23A and 23B, chains 23A and 23B could be moved with manual wrenches. Motors and the wrenches used to power chains 23A and 23B are preferably hydraulic or electric. If desired and the wrenches and motor are electric, motors are selectively electrically coupled via electrical wiring or cables to a 12 volt battery, such as the one found in pick-up 10, but could also be powered by alternate power sources, such as a separate 12 volt battery or the like. Also, while the preferred embodiment is front loading, it is conceivable that the invention could be adapted to be rear load. Likewise, other mechanisms, besides the forked assembly, can be used to load flat bed, such as a scoop or shovel. Finally, while the preferred embodiment works best with round bales of hay, the preferred embodiment could also be adapted to work with square bales of hay.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to the exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

What is claimed is:

1. A transport apparatus to load and to transport at least one bail of hay, resting on a ground position, comprising:
   (a) a goose-neck assembly, said goose-neck assembly attachable to a towing vehicle; and
   (b) a trailer attached to said goose-neck assembly, said trailer having a pair of wheels connected by an axle positioned to support said trailer, said pair of wheels oriented in a first direction, said trailer also having at least one prong that pivots around a prong axle, said prong axle attached to a first portion of said trailer, said at least one prong is bent, so that when said at least one prong is rotated toward said ground position a sufficient amount, said at least one prong is adapted to move said at least one bail of hay from said ground position to said trailer, said trailer also having a support wheel positioned proximate to said first portion to support said trailer while said at least one prong is moving said at least one bail of hay from said ground position to said trailer, said support wheel able to be selectively raised to a raised position in which said support wheel is lifted off of a second ground position and lowered to a lowered position in which said support wheel is in contact with said second ground position, said support wheel being in a fixed orientation such that said support wheel is oriented in said first direction when said support wheel is lowered to said lowered position.

2. The transport apparatus of claim 1, further comprising:
   (c) a motor to automatically raise and lower said at least one prong.

3. The transport apparatus of claim 1, wherein said at least one prong is bent at approximately a 90 degree angle.

4. The transport apparatus of claim 1, wherein said goose neck assembly is adapted to be secured with at least one pivot pin.

5. The transport apparatus of claim 1, wherein said goose-neck assembly is adapted to pivot, so that said trailer can be positioned along side a towing vehicle.

6. The trailer of claim 1, wherein said support wheel is oriented in said first direction in a fixed manner.

7. The transport apparatus of claim 1, wherein said trailer has a second pair of wheels connected by a second axle, said second axle located in close proximity to said pair of wheels.

8. The transport apparatus of claim 1, wherein said trailer has at least one motorized transport mechanism to transport said at least one bail of hay from said first portion of said trailer to a second portion of said trailer.

9. The transport apparatus of claim 8, wherein said at least one motorized transport mechanism is at least two motorized chains joined together with at least one bar to grip, to secure, and to transport said at least one bail of hay.

10. A trailer to load and transport a bail of hay, comprising:
   (a) a goose neck towing assembly selectively attachable to a towing vehicle; and
   (b) a flat bed selectably attached to said towing assembly, said flat bed having a forked assembly, said forked assembly having at least one prong, said at least one prong bent at an angle, said forked assembly adapted to selectively pivot around an axle attached to a first portion of said flat bed, so that said forked assembly is able to lift said bail of hay onto said first portion of said flat bed, and further wherein said flat bed has at least one motorized transport mechanism to transport said bail of hay from said first portion of said flat bed to a second portion of said flat bed, said at least one motorized transport mechanism grips and secures said bail of hay, wherein said flat bed has a pair of wheels oriented in a first direction, with one wheel on each side of said flat bed and said flat bed having a support wheel positioned between one wheel on one side of said flat bed and said first portion, said support wheel adapted to be raised and lowered, said support wheel oriented in said first direction.

11. The trailer of claim 10, further comprising a motor to automatically raise and lower said at least one prong of said forked assembly.

12. The trailer of claim 10, further wherein towing assembly is able to pivot, so that said flat bed can be positioned along side said towing vehicle.

13. The trailer of claim 10, wherein said at least one prong is bent approximately a 90° angle.

14. The transpose apparatus of claim 10, wherein said flat bed has a second pair of wheels, with one wheel on each side of said flat bed, said second pair of wheels located in close proximity to said pair of wheels.

15. A trailer to load and transport a bail of hay, comprising:
 (a) a flat bed;
 (b) a means to load said bail of hay onto said flat bed, said means comprising at least one prong bent at an angle;
 (c) a goose neck towing assembly attached to said flat bed;
 (d) at least one-pair of wheels attached to said flat bed and oriented in a first direction; and
 (e) a support wheel means to support said flat bed while said flat bed is being loaded, said support wheel means able to be selectably raised and lowered and being oriented in said first direction.

16. The trailer of claim 15, wherein said support wheel means is oriented in said first direction in a fixed manner.

* * * * *